June 16, 1964  J. W. ADDIE  3,137,783
METHODS OF ARC WELDING
Filed Jan. 16, 1961
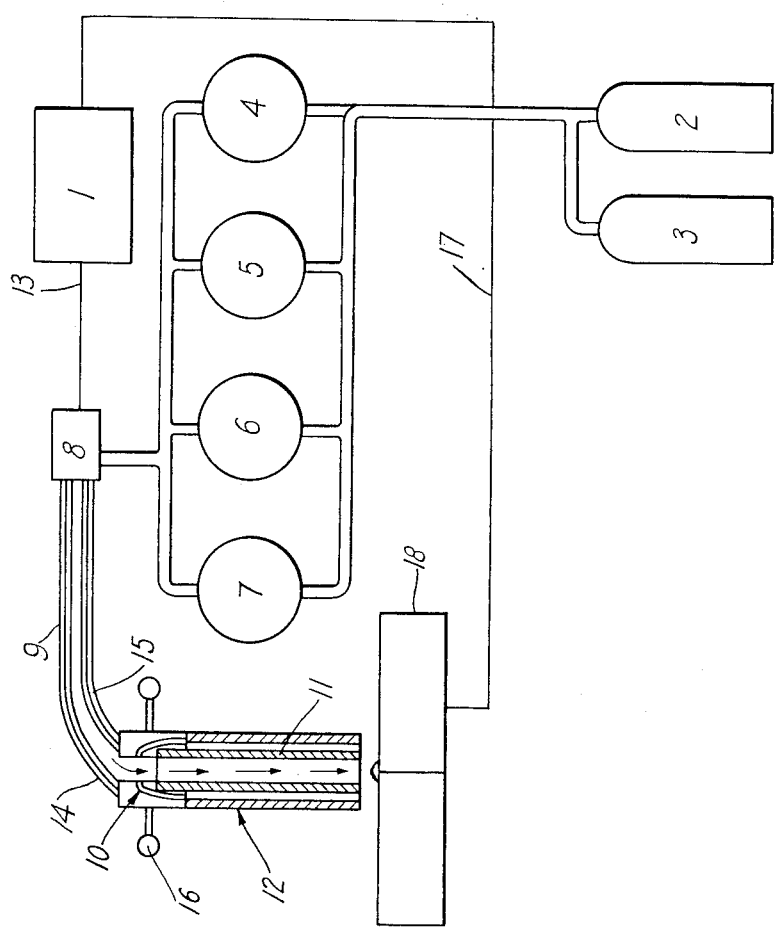

United States Patent Office 3,137,783
Patented June 16, 1964

3,137,783
METHODS OF ARC WELDING
James William Addie, Withington, Manchester, England, assignor to Associated Electrical Industries Limited, London, England, a British company
Filed Jan. 16, 1961, Ser. No. 83,010
Claims priority, application Great Britain Jan. 19, 1960
1 Claim. (Cl. 219—74)

The invention relates to methods of arc welding, especially the welding of ferrous metals and to apparatus for performing such methods.

This invention relates more particularly to a method of and apparatus for forming a ferrous weld deposit by supplying the added metal through a hollow non-consumable electrode to the arc wholly in powder form and entrained in a non-inert shielding gas.

Heretofore, in many methods of arc welding, a shielding gas or gas mixture has been employed to avoid contamination of the added metal and weld deposit by atmospheric gases. In these methods, the added metal has been in the form of a consumable electrode in some cases continuous and in others of set length. Furthermore, the shielding gases were supplied to the arc region as the products of decomposition of a coating applied to the consumable electrode as in the particular case of stick electrodes or from cylinders or other suitable sources as in the case of metal inert gas welding.

For both ferrous and non-ferrous deposits it has been proposed to entrain part of the added metal in powder form in an inert shielding gas supplementing metal added from a continuous consumable electrode with the object of modifying the composition of the weld deposit or of achieving a composition not obtainable in practice from the consumable electrode alone, the inert gas proposed is relatively expensive. Further, the rate of supply of metal from the consumable electrode is entirely dependent on arc energy, whereas the rate of supply of metal powder is solely dependent on rate of flow of the carrier gas. Since the added metal is obtained from both sources it is difficult to achieve a constant composition of deposit in any particular case.

An object of the present invention is a method of arc welding having a much greater degree of operational flexibility and adaptability and which can achieve both a range of deposition rates at a single welding current value and very high deposition rates at high currents, with rate of metal supply to the molten pool independently variable, with good quality of weld metal and with the facility for controlling the composition of the weld metal within wide limits.

It is a further object of the present invention to provide a gas shielding atmosphere which is inexpensive, does not make the arc unstable and is not oxidising in nature relative to the weld deposit, and to supply the added metal wholly in powder form and entrained in the shielding gas.

It has also been proposed to supply a gas mixture which is neither oxidizing or reducing from cylinders of carbon dioxide and carbon monoxide to shield the arc with a continuously fed bare or lightly coated electrode. These gases are relatively inexpensive but the use of carbon monoxide is objectionable.

It has been proposed further that for ferrous metals carbon dioxide alone should be used as a shielding gas with a consumable electrode. Since carbon dioxide at arc temperature is oxidizing the consumable electrode has to be of correctly deoxidized composition and it is difficult to avoid weld defects such as porosity. Furthermore it has been found that special sources of current are necessary to obtain arc characteristics which permit transfer of the consumable electrode without excessive spatter loss.

The gas is of such a nature and is supplied under such conditions as to provide a shielding and controlling atmosphere for the electrode, the arc and the molten pool, and especially to reduce the hydrogen content of the weld. The gas may be carbon dioxide only or a mixture comprising carbon dioxide and oxygen.

Because the stream of shielding gas is also used to introduce weld material to the arc in the form of metal powder entrained in the gas, the composition of the deposit may then be accurately controlled by varying the composition of a single added metal powder or by varying the proportions of a number of metal powders of different compositions. The shielding gas is preferably supplied under a high pressure and this pressure and the rate of flow of the gas can be controlled independently of the welding current to suit the required rate of supply of the metal powder, whilst the high pressure also has a favourable effect on the quality of the final weld.

The electrode is non-consumable with respect to the weld deposit but consumable with respect to the arc atmosphere and is composed of carbon or substantially of carbon and so is able to withstand very high current densities, from which it follows that very high heat inputs are available for melting the added metal and the workpiece, such conditions allowing high deposition rates to be achieved.

The process is applicable with sources of alternating current or of direct current. In the case of direct current the flexibility of operation is increased by making use of the fact that in a carbon-metal arc approximately two thirds of the arc energy is generated at the anode and approximately one third of the energy at the cathode. Connection of the electrode to the negative terminal of the direct current supply is therefore applicable where high deposition rates are desired because the high proportion of energy generated at the molten pool (in this case the anode) is largely absorbed in melting the metal powder added to the pool.

On the other hand connection of the electrode to the positive terminal of the direct current supply is applicable for lower deposition rates because of the resulting shallow fusion into the workpiece. This method is therefore applicable for the deposition of hard facing metal. Relatively shallow fusion can, however, also be achieved when the electrode is connected to the negative terminal of the direct current supply provided that the rate of supply of the metal powder is raised high enough. Under both these conditions i.e. connection of the electrode to the negative terminal or connection of the electrode to the positive terminal of the direct current supply, dilution of the deposited metal by the metal of the workpiece can be kept to a minimum.

The potential rate of deposition of the metal is greater with the direct current supply (the electrode being connected to the negative pole) than is the case with an alternating current supply.

In the case where the method is employed with an alternating current supply, arc stabilisation is desirable and for this purpose a high frequency injection unit may be used in the method according to the invention, the advantages achieved being arc initiation without any contact between the electrode and the workpiece and therefore without contamination of the electrode by the workpiece and vice versa, and in addition good arc stability without the introduction of stabilisers in the gas stream itself or the incorporation of stabilising materials in the electrode.

The present invention also consists in an apparatus for effecting the method of welding, the apparatus comprising a non-consumable or substantially non-consumable electrode, means for introducing a stream of shielding gas to the arc through or around the said electrode and dispensing means for causing a stream of metal powder to be entrained in the said stream of shielding gas.

The dispensing means may comprise one or more dispensers for metal powder, these being powder containers through which pass a branch or branches of a gas pipe leading from a supply of the shielding gas under pressure to a suitable mixing and injection point in the apparatus, which may be an electric cable and gas junction box, where a main current cable from the electric generator is joined to the hollow cable leading to the non-consumable or substantially non-consumable electrode.

An example of an apparatus illustrating the method according to the invention and the manner of its performance will now be described with reference to the accompanying diagrammatic drawing.

In the sole FIG. 1 is an electric generator for supplying the welding current and 2 and 3 are gas cylinders supplying a controlled mixture of gases, for example carbon dioxide and oxygen, or a single gas (e.g. carbon dioxide only) under controlled high pressure to a series of metal powder dispensers 4, 5, 6 and 7 connected in parallel between the common gas pipe from the gas cylinders to a cable and gas junction box 8. A main electric supply cable 13 for the arc current is connected between the generator 1 and the cable and junction box 8 and the other side of the junction box is both electrically and mechanically connected to an electrode holder 10 by means of an electric cable 9 which also serves to provide a channel for the stream of shielding gas and the metal powder entrained therein. Such cable may be a coaxial cable with an external insulating sheath 14 and an internal tubular conductor or conductors 15. The electrode holder 10 is in the form of an adjustable collet or chuck which can be tightened by means of a handle on to a tubular electrode 11 of carbon. The electrode holder also serves to support a tubular ceramic nozzle 12 which coaxially surrounds the carbon electrode 11. A return electric cable 17 is connected from the other terminal of the generator 1 to the workpiece 18 which may be of steel plate.

The pressure of the shielding gas supplied from cylinders 2 and 3, and the rate of flow thereof through the dispensers to the cable and gas junction box, is controlled by known means and in such a manner that metal powder is supplied from the dispensers at the required rate. Also each dispenser may be individually controllable by means (not shown) to vary the rate of supply of the metal powder in that dispenser from zero to required maximum. The stream of shielding gas also flows in the annular space around the carbon electrode 11.

A wide range of different deposit compositions on metal can be produced by simple adjustment of the proportion of each metal powder added by the injection method above described.

As is well known carbon dioxide when used unmodified as a shielding gas results in an oxidizing atmosphere at arc temperature. In the method proposed the hollow non-consumable electrode is arranged to be of carbon or substantially of carbon and the arc atmosphere is therefore modified by reaction between the carbon of the electrode and the carbon dioxide or mixture of carbon dioxide and oxygen separately supplied. The electrode while substantially non-consumable in respect of the contribution to the weld deposit is therefore partly consumable in respect of the arc atmosphere. By reason of such contribution from the electrode to the arc atmosphere the arc is both satisfactorily shielded and stabilized over a wide range of operating current whether the current source has a drooping or substantially constant potential characteristic.

Because in the present invention the added metal is supplied wholly in powder form the method ensures a very high degrees of accurate control of weld composition and of operational flexibility and adaptability. For example, the method achieves a range of deposition rates at a single current value or, if preferred, a high deposition rate at high current with the assurance of a homogeneous deposit. Also by varying the composition of a single added powder or by varying the proportion of a number of added powders, a range of weld deposits of desired composition is achieved with the assurance of homogeneous deposits in each case. For example, where a deposit of cast iron is required this is achieved by the use of cast iron powder or by the use of a mixture of iron powder and ferro alloy powders including one which is rich in carbon, or by the use of iron powder and ferro alloy powders supplied from powder dispensers separately. Again, where a deposit of Hadfield steel hardfacing metal is required this is achieved by the use of iron powder and ferro alloy powders including ferro manganese supplied as a single mixture or separately. Choice of metal powders and their use singly mixed or separately dispensed is determined by economic considerations but, in most if not all cases a single metal powder or combination of metal powders is available at a price which enables the required ferrous deposit to be produced with the method of the present invention more cheaply than with any other welding method.

Further, the method is applicable both to machine welding and to manual welding in all positions. Moreover the method is applicable with sources of alternating current or direct current. In the latter case at an appropriate current, straight polarity connection of the electrode enables high deposition rates at high rates of supply of metal powder or, if desired shallow fusion of the workpiece at higher rates of supply of metal powder, while reverse polarity also achieves shallow fusion, at the same current. Shallow fusion of the workpiece is accordingly practicable with either straight or reverse polarity, and the method is particularly applicable therefore to the deposition of hardfacing metal with the assurance that dilution of the deposited metal by the metal of the workpiece is kept to a desirable minimum.

Ferrous metals to which the above described methods are applicable include cast irons, low, medium and high carbon steels, low and medium carbon alloyed steels, stainless and heat resisting steels, austenitic manganese steels and hard facing weld deposits.

In this specification a non-consumable or substantially non-consumable electrode means an electrode composed of material whose principle function is to conduct welding current without contributing any welding metal or welding flux to the arc.

What I claim is:

An electric arc welding method for ferrous metals for forming a weld deposit of accurately prearranged composition which comprises arranging the end of a hollow electrode which is at least mainly of carbon adjacent a workpiece, forming an arc while shielding the arc region and electrode with a non-inert stream of gas comprising carbon dioxide, and entraining at least one metal powder in the shielding gas stream through the hollow electrode to carry the metal powder into the molten pool formed by the arc in the workpiece, such metal powder representing the whole of the metal added to the weld deposit and being controllable in respect of rate of supply to the weld deposit, and the carbon of the electrode being non-consumable with respect to the weld deposit but consumable by reaction with the gases in the arc atmosphere, said arc atmosphere giving a stable arc with either direct or alternating current.

References Cited in the file of this patent

UNITED STATES PATENTS

| | | |
|---|---|---|
| 1,161,366 | Wohlrab | Nov. 23, 1915 |
| 1,589,017 | Lincoln | June 15, 1926 |
| 1,708,003 | Weinman | Apr. 9, 1929 |
| 2,121,693 | Henderson | June 21, 1938 |
| 2,475,357 | Miller | July 5, 1949 |
| 2,504,867 | Muller | Apr. 18, 1950 |
| 2,727,125 | Muller | Dec. 13, 1955 |
| 2,920,181 | Rockefeller et al. | Jan. 5, 1960 |
| 2,948,803 | Wilson et al. | Aug. 9, 1960 |
| 2,963,570 | Riepel | Dec. 6, 1960 |
| 2,988,627 | Koopman | June 13, 1961 |

FOREIGN PATENTS

| | | |
|---|---|---|
| 807,645 | Great Britain | Jan. 21, 1959 |